Sept. 27, 1938.  P. F. DANEL  2,131,025
AUTOMATIC ROTARY VALVE
Filed May 7, 1936
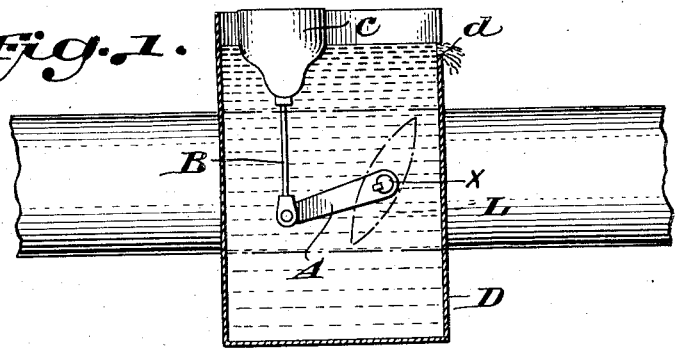
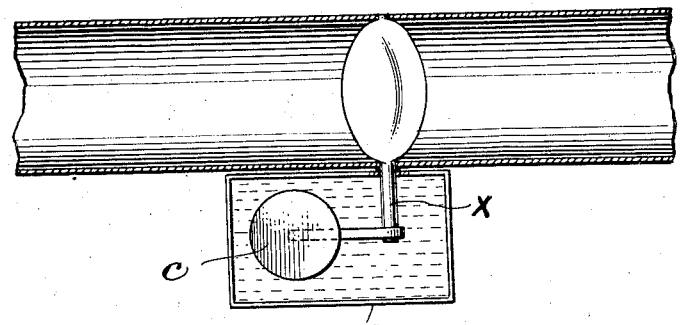
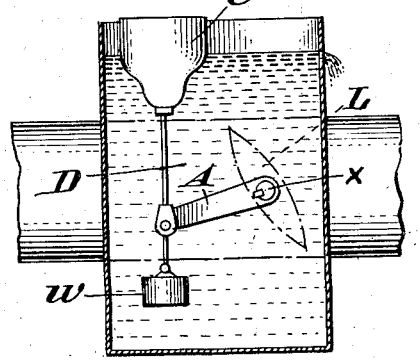
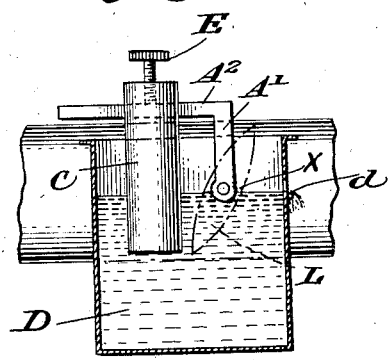
Inventor;
P. F. DANEL
By Bonnelycke, Young, Emery & Thompson Attys.

Patented Sept. 27, 1938

2,131,025

UNITED STATES PATENT OFFICE 2,131,025

AUTOMATIC ROTARY VALVE

Pierre François Danel, Grenoble, France, assignor to Ateliers Neyret-Beylier & Piccard-Pictet, a corporation of France Application May 7, 1936, Serial No. 78,515
In France September 30, 1933

9 Claims. (Cl. 137—68)

(Granted under the provisions of sec. 14, act of March 2, 1927; 357 O. G. 5)

This application is a continuation-in-part of my pending United States application, Serial No. 746,293, filed October 1, 1934.

This invention concerns a rotary valve, as a butterfly or wicket valve, with an automatic setting of its position, so that it will control the flow at a constant, but adjustable, value even with rather big variations of upstream and downstream pressures.

The hydraulic torque M on the stem of a rotary valve is practically represented by the formula $$M = KV^2 D^3$$

where V is the velocity in the upstream penstock or pipe, D is a characteristic dimension of the valve, and K is a numerical coefficient which, with given units, is only a function of the angular position of the rotary valve.

Under varying pressure condition, if the valve is used to control the flow to a constant value, the hydraulic torque on the valve stem will be simply proportional to K as long as, for constant flow, the penstock velocity V is constant.

The rotary valves constructed according to the invention embody means whereby, at every angular setting, a torque proportional to K is opposed to the hydraulic torque. The discharge is then automatically constant whatever the pressure variation may be within the designed working range.

Figs. 1 and 2 show diagrammatically in elevation and plan a design according to the present invention in which the butterfly valve L has angularly fixed on its stem X a lever A connected to a shaped float C by a link B. The float C is disposed into a vessel D, the level in said vessel being established by a weir d allowing a constant outflow of water. Water is fed into said vessel from a leakage through the bearing of the stem. The torque from the float, conveniently shaped, depends obviously of the float being more or less submerged. In these figures, the water flows from left to right and tends to rotate the valve L in a counter-clockwise direction to close it against the buoyant action of float C.

Fig. 3 shows in elevation another form of construction of the automatic valve according to the invention. In this figure, the water flows from left to right and tends to rotate the valve in a clockwise direction to a closed position against the action of weight W hanging at the end of the lever A. The float C acting against the weight W exerts a varying force in order to obtain the correct torque at each angular position of the disc. With this form of invention the actual size of the float may be less than in that of Figs. 1-2.

Fig. 4 shows in elevation another form of construction of the automatic valve according to the invention in which the water in vessel D is regulated by the weir d at the same level as the axis of the butterfly valve. The lever in this construction is made of two perpendicular arms $A_1$—$A_2$, and the float is fixed on the lever $A_2$, its position being slidably adjustable. The float is fixed at each position for instance by a screw E. The constant discharge may be thus varied by modifying the setting of the float on the arm $A_2$.

For each type of rotary valve the proper variation of K with angular setting should be ascertained from theory or experiments.

Provision should be made for minimizing friction and a dash pot can be used to prevent hunting with sudden variation in pressure.

It is obvious that the value of the constant discharge in the forms of construction shown in Figs. 1, 2, and 3 may be varied, by changing either the float or the weight.

I claim:

1. Valve mechanism for a hydraulic conduit, comprising a disc pivoted in the conduit about a median axis and tending to be closed by the moment of the hydraulic pressure on said valve, a constant level tank adjacent the hydraulic conduit, a float with a variable degree of immersion in said tank, a lever connecting said float to said axis, the hydraulic torque of the disc on said axis being balanced by said float at each angular setting, the float being connected to the lever and shaped to obtain a constant flow through the valve.

2. Valve mechanism for a hydraulic conduit, comprising a disc pivoted in the conduit about a median axis and tending to be closed by the moment of the hydraulic pressure on said valve, a constant level tank adjacent the hydraulic conduit, a float with a variable degree of immersion in said tank, a lever connecting said float to said axis, the hydraulic torque of the disc on said axis being balanced by said float at each angular setting, the float being connected to the lever and shaped to obtain a constant flow through the valve, the said float being changeable in order to modify the value of the constant flow.

3. Valve mechanism for a hydraulic conduit, comprising a disc pivoted in the conduit about a median axis and tending to be closed by the moment of the hydraulic pressure on said valve, a constant level tank adjacent the hydraulic conduit, a float with a variable degree of immersion in said tank, a lever connecting said float to said axis, the hydraulic torque of the disc on said axis being opposed by that of a weight hanging at the end of the said lever, the said float being connected to the lever and acting against the weight in order to obtain a constant flow through the valve.

4. Valve mechanism for a hydraulic conduit, comprising a disc pivoted in the conduit about a median axis and tending to be closed by the moment of the hydraulic pressure on said valve, a constant level tank adjacent the hydraulic conduit, a float with a variable degree of immersion in said tank, a lever connecting said float to said axis, a weight hanging on the end of said lever for opposing the hydraulic torque of the disc on said axis, the said float being connected to the lever and acting against the weight in order to obtain a constant flow through the valve, the said float being changeable in order to modify the value of the constant flow.

5. Valve mechanism for a hydraulic conduit, comprising a disc pivoted in the conduit about a median axis and tending to be closed by the moment of the hydraulic pressure on said valve, a tank adjacent the hydraulic conduit with its water surface regulated at the axis level, a float with a variable degree of immersion in said tank, a bent lever connecting said float to said axis, said float being mounted on said lever, the hydraulic torque of the disc on said axis being thus balanced at each angular setting in order to obtain a constant flow through the valve.

6. Valve mechanism for a hydraulic conduit, comprising a disc pivoted in the conduit about a median axis and tending to be closed by the moment of the hydraulic pressure on said valve, a tank adjacent the hydraulic conduit with its water surface regulated at the axis level, a float with a variable degree of immersion in said tank, a bent lever connecting said float to said axis, said float being slidably adjustable on the lever, the hydraulic torque of the disc on said axis being thus balanced at each angular setting in order to obtain a constant flow through the valve.

7. A valve mechanism for a hydraulic conduit, comprising a disc positioned in the conduit, means including a shaft for mounting said valve for pivotal movement about a median axis, the flow of water through said conduit tending to close said valve, said shaft extending through the wall of the conduit, a lever carried by said shaft, a tank positioned adjacent said conduit and adapted to contain a body of water of constant level, a variably immersible float supported by the water in said tank, and means connecting the free end of said lever to said float.

8. A valve mechanism for a hydraulic conduit, comprising a disc positioned in the conduit, means including a shaft for mounting said valve for pivotal movement about a median axis, the flow of water through said conduit tending to close said valve, said shaft extending through the wall of the conduit, a lever carried by said shaft, a tank positioned adjacent said conduit and adapted to contain a body of water of constant level, and a float supported by the water in said tank and slidably mounted on said lever for opposing the hydraulic force tending to close the valve, the float being constructed to exert a force balancing the flow force tending to close said valve to maintain a substantially constant discharge through the conduit.

9. A valve mechanism for a hydraulic conduit, comprising a disc positioned in the conduit, means including a shaft for mounting said valve for pivotal movement about a median axis, the flow of water through said conduit tending to close said valve, said shaft extending through the wall of the conduit, a lever carried by said shaft, a tank positioned adjacent said conduit and adapted to contain a body of water of constant level, a float supported by the water in said tank and slidably mounted on said lever for opposing the hydraulic force tending to close the valve, the float being constructed to exert a force balancing the flow force tending to close said valve to maintain a substantially constant discharge through the conduit, and means for securing the float in adjusted positions on said lever.

PIERRE FRANÇOIS DANEL.